(12) United States Patent
Ezell et al.

(10) Patent No.: US 10,601,831 B2
(45) Date of Patent: Mar. 24, 2020

(54) ACCESSING LOCAL INFORMATION BASED ON A BROWSER SESSION

(71) Applicant: Avaya Inc., Santa Clara, CA (US)

(72) Inventors: Joel M. Ezell, Broomfield, CO (US); Mehmet C. Balasaygun, Freehold, NJ (US); Geoff Baskwill, Almonte (CA)

(73) Assignee: Avaya Inc., Santa Clara, CA (US)

( * ) Notice: Subject to any disclaimer, the term of this patent is extended or adjusted under 35 U.S.C. 154(b) by 469 days.

(21) Appl. No.: 14/943,225

(22) Filed: Nov. 17, 2015

(65) Prior Publication Data

US 2017/0142111 A1    May 18, 2017

(51) Int. Cl.
*H04L 29/06*    (2006.01)
*H04L 29/08*    (2006.01)

(52) U.S. Cl.
CPC .......... *H04L 63/10* (2013.01); *H04L 63/0807* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2011/0239123 A1* | 9/2011 | Tsujimoto | H04L 63/08 715/740 |
| 2013/0269019 A1* | 10/2013 | Garmark | G06F 9/54 726/9 |
| 2014/0245418 A1 | 8/2014 | Balasaygun et al. | |
| 2014/0289510 A1* | 9/2014 | Tuch | H04L 63/102 713/156 |
| 2014/0337959 A1* | 11/2014 | Garmark | G06F 9/54 726/9 |
| 2015/0163056 A1* | 6/2015 | Nix | H04L 9/0869 380/46 |
| 2015/0358328 A1* | 12/2015 | Kaplan | H04L 67/1095 726/6 |
| 2016/0313882 A1* | 10/2016 | Brown | G06F 3/0484 |

\* cited by examiner

*Primary Examiner* — Kambiz Zand
*Assistant Examiner* — Arezoo Sherkat
(74) *Attorney, Agent, or Firm* — Sheridan Ross P.C.

(57) ABSTRACT

When a user is attempting to access a server application, a challenge is received, in a browser, for a one or more login credentials to access a server application (e.g., a web page). For example, a user is requested to provide a user name and password to login to the server application. In response to the user providing the credentials via the browser, the login credentials are sent. If the credentials are validated, an access token is received by the browser from the server application. In response to receiving the access token for the server application, the browser sends the access token and an address for the server application, via a local loopback address, to a local application. This allows the local application to send local information, such as local files, to the server application using the token.

20 Claims, 2 Drawing Sheets

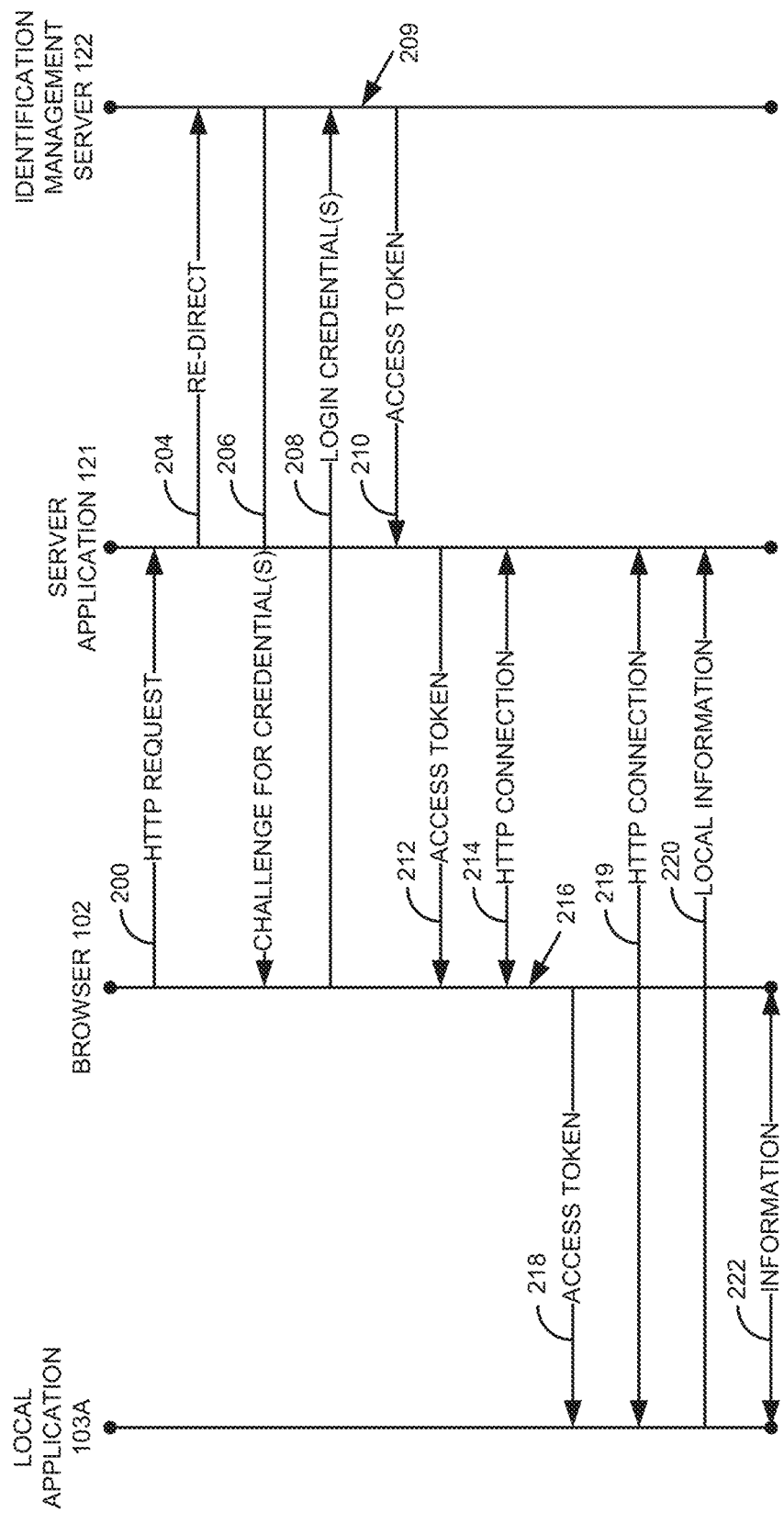

ACCESSING LOCAL INFORMATION BASED ON A BROWSER SESSION

TECHNICAL FIELD

The systems and methods disclosed herein relate to communication applications and in particular web based communication applications.

BACKGROUND

Web browsers are strongly sandboxed, such that Javascript that is executing in the web browser has very limited access to the operating system or applications that are running on the same operating system. The purpose of the sandbox in a web browser is to provide security for information that is stored locally on the device running the browser.

However, this can also cause problems. For example, if JavaScript that is downloaded into a browser needs to be able to access information that is stored locally, the sandbox prevents this kind of direct access to information. This limits what functionality can be provided for applications that use a browser.

BRIEF SUMMARY

Systems and methods are provided to solve these and other problems and disadvantages of the prior art. When a user is attempting to access a server application, a challenge is received, in a browser, for one or more login credentials to access a server application (e.g., a web page). For example, a user is requested to provide a user name and password to login to the server application. In response to the user providing the credentials via the browser, the login credentials are sent. If the credentials are validated, an access token is received by the browser from the server application. In response to receiving the access token from the server application, the browser sends the access token and server application address, via a local loopback address, to a local application. This allows the local application to send local information, such as local files, to the server application using the token. In addition, the local application can send a media stream (e.g., a voice or video media stream) to the to the server application. For example, where a browser is not capable of sending a media stream via Web Real-Time Communication (WebRTC) protocol.

BRIEF DESCRIPTION OF THE DRAWINGS

FIG. 2 is a flow diagram of a process for accessing local information based on a browser session.

DETAILED DESCRIPTION

Figure 1:
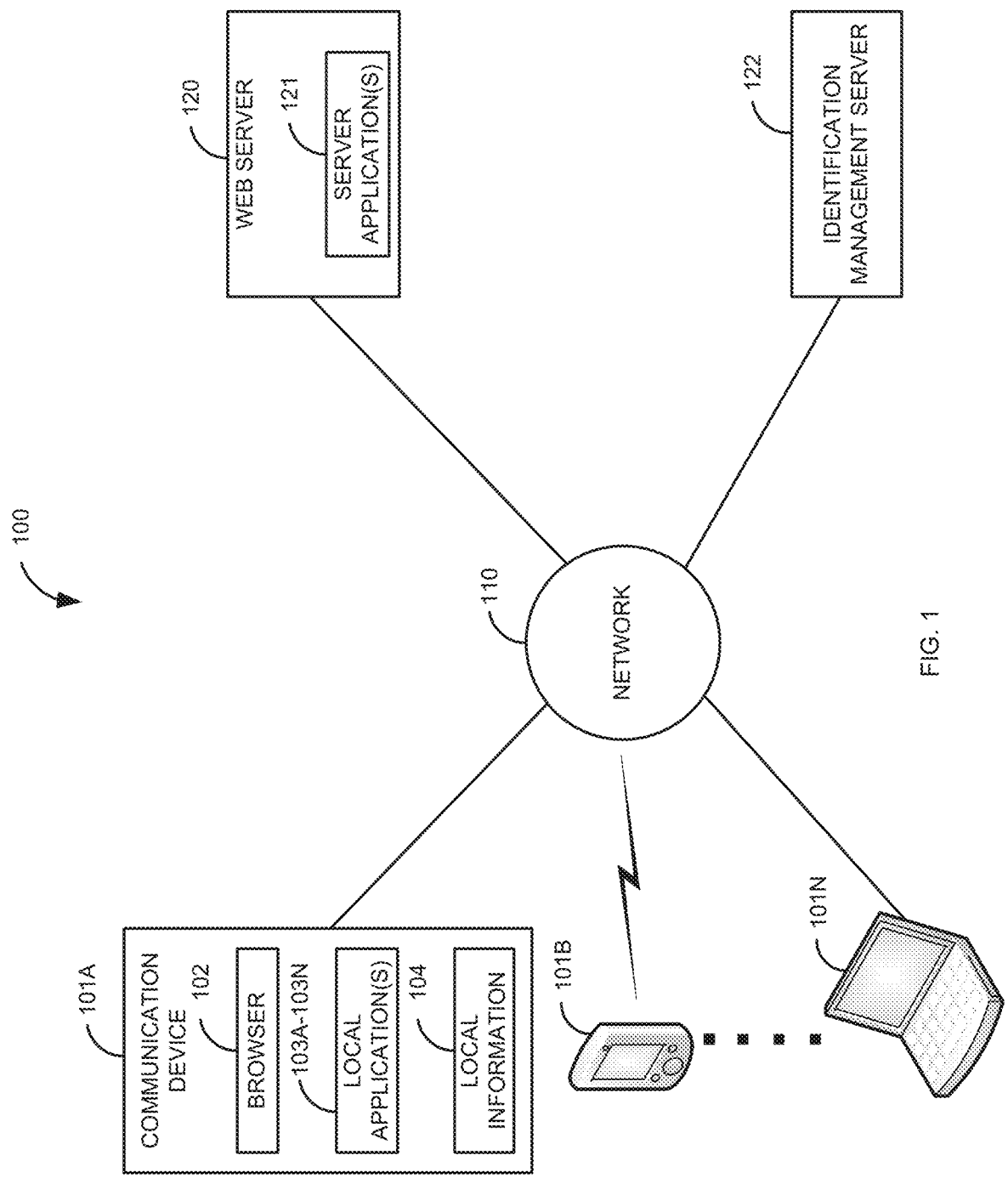
FIG. 1 is a block diagram of a first illustrative system for accessing local information based on a browser session.

FIG. 1 is a block diagram of a first illustrative system 100 for accessing local information 104 based on a browser session. The first illustrative system 100 comprises communication devices 101A-101N, a network 110, a web server 120, and an identification management server 122.

The communication device 101 can be or may include any device that can communicate on the network 110, such as a Personal Computer (PC), a telephone, a video system, a cellular telephone, a Personal Digital Assistant (PDA), a tablet device, a notebook device, a smart phone, and/or the like. As shown in FIG. 1, any number of communication devices 101A-101N may be connected to the network 110, including only a single communication device 101.

The communication device 101A further comprises a browser 102, local application(s) 103A-103N, and local information 104. The browser 102 can be or may include any browser 102 that can browse the web server 120, such as Internet Explorer™, Google Chrome™, Safari™, Opera™, Firefox™, and/or the like.

The local application(s) 103A-103N can include a variety of different types of local applications 103, such as a communication application, a media application, a file management application, a data processing application, a web management application, a contact center application, a social media application, and/or the like. The local application 103 may comprise any number of local applications 103 from 1 to N, where N is an integer. The local applications 103A-103N work in conjunction with the server application(s) 121. The local applications 103A-103N are non-browser applications.

The local information 104 can be or may include any information that is local to the communication device 101A that cannot be accessed by the browser 102, such as, a local file(s), Windows® registry information, local operating system information, local configuration information, user information, contact lists, log files, personal preferences, and/or the like. The local information 104 can include information in multiple files and/or locations.

In FIG. 1, the communication devices 101B-101N are not shown to comprise the browser 102, the local application(s) 103, and the local information 104. However, each of the communication devices 101A-101N may have some or all of the elements 102-104.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), Hypertext Transfer Protocol (HTTP), Web Real-Time Protocol (WebRTC), and/or the like. Thus, the network 110 is an electronic communication network configured to carry messages via packets and/or circuit switched communications.

The web server 120 can be or may include any hardware coupled with software that provides web services, such as, Apache™, Nginx™, IIS™, Varnish™, Apache Tomcat Coyote™, and/or the like. The web server 120 further comprises one or more server applications 121. The server application(s) 121 can be or may include any server application 121 that can run on the web server 120, such as a business application, a communication application, a transaction application, a social media application, a media application, a multimedia application, an email application, an Instant Messaging (IM) application, and/or the like.

The identification management server 122 can be or may include any hardware coupled with software that can provide authentication services. For example, the identification management server 122 may be a third party identification management server 122 that provides single sign-on for multiple web server applications 121 and/or multiple web sites. In one embodiment, the identification management server 122 may be a corporate identification management server 122 that provides authentication services on for web services/web server applications 121 for an enterprise, corporation, entity, and/or the like.

FIG. 2 is a flow diagram of a process for accessing local information 104 based on a browser session. Illustratively, communication devices 101A-101N, the browser 102, the local applications 103A-103N, the web server 120, the server application(s) 121, and the identification management server 122 are stored-program-controlled entities, such as a computer or processor, which performs the method of FIG. 2 and the processes described herein by executing program instructions stored in a computer readable storage medium, such as a memory or disk. Although the method described in FIG. 2 is shown in a specific order, one of skill in the art would recognize that the steps in FIG. 2 may be implemented in different orders and/or be implemented in a multi-threaded environment. Moreover, various steps may be omitted or added based on implementation.

The process of FIG. 2 is shown using HTTP and IP as an illustrative example. However, the process of FIG. 2 is not specific to HTTP and IP. For example, the process of FIG. 2 may be implemented using Web Real-Time Protocol (WebRTC)/IP and/or other protocols.

The process starts when the browser 102 sends an HTTP request to the server application 121 in step 200. For example, when a user at the communication device 101A clicks on (or enters) a Uniform Resource Locator (URL) for the server application 121, the browser 102 sends an HTTP request to the web server 120/server application 121. The server application 121 redirects the HTTP request to the identification management server 122 in step 204. The redirected HTTP request of step 204 includes the address (e.g., an Internet Protocol (IP) address) of the communication device 101A that sent the HTTP request of step 200.

The identification management server 122 sends, in step 206, a challenge for credential(s) to the browser 102. For example, the challenge for credential(s) may be a secure request (e.g., using HTTPS (secure HTTP)) from a web page that asks the user to provide their user name and password. Alternatively, the request may be for the user to provide a digital certificate and password, a multifactor authentication with a physical token generator, a biometric, or some other form of credential(s). In response, the user provides the credential(s), via the browser 102. The browser 102 sends the credential(s), in step 208, to the identification management server 122.

The identification management server 122 verifies the credential(s) in step 209. If the credential(s) are validated (e.g., the user name and password are correct) the identification management server 122 sends, in step 210, an access token to the server application 121. The access token can be any identifier that uniquely identifies the communication session between the browser 102 and the server application 121, such as a Globally Unique Identifier (GUID), a hash value, a digital certificate, a session identifier, and/or the like. In some embodiments, the access token may include an encryption key for a secure communication session, such as for a communication session using Secure Sockets Layer (SSL).

The server application 121 sends the access token to the browser 102 in step 212. At this point, the browser 102 and the server application 121 have established an HTTP connection (e.g., an HTTPS connection) that has been authenticated in step 214. The access token is used to identify the specific HTTP(S) connection. For example, as the browser 102 makes requests, the browser 102 sends the access token in the request. Likewise, the server application 121 uses the access token in a response.

In one embodiment (not shown), when the browser 102 receives the token in step 212, the browser 102 sends a login request using the access token to the server application 121. In step 212, the message is to refresh the access tokens. The application server 121 the send a login response OK message to the browser.

In response to receiving the access token in step 212, the browser 102 gets the access token in step 216. The browser 102 sends, via a local loopback address (127.0.0.0 to 127.0.0.8), the access token and the address of the web server 120 (e.g., a URL of the server application 121 on the web server 120) to the local application 103A in step 218. For example, the local application 103A has an HTTP stack that is bound to the local loopback address, which is the loopback IP address of 127.0.0.1. Alternatively, the local application 103A could use another protocol (different from HTTP) to communicate with the browser 102 on the local loopback IP address of 127.0.0.1. In one embodiment, the browser 102 communicates with the local application 103A via non IP protocol. The access token sent in step 218 may also include the encryption key for a secure connection.

At this point, the local application 103A can now send messages to the server application 121 using the access token, the address of the server application 121, the encryption key, and a different socket (e.g., an IP socket) to establish an HTTP(S) connection with the server application 121 in step 219. This essentially binds the local application 103A and the application running in the browser 102 (e.g., JavaScript downloaded from the server application 121); the binding allows the local application 103A to send the local information 104 on behalf of the browser 102 using the access token in step 220.

In addition, the local application 103A can send an HTTP request to the server application 121 using the access token to get information from the server application 121. The HTTP request is sent using the different socket. For example, once the local application 103A receives the access token, the local application 103A can send an HTTP request (with the different socket) to the server application 121 for a list of files that the server application 121 would like to receive. The server application 121 can then respond to the local application using the different socket with the list of files.

To illustrate, consider the following example. A user at communication device 101A clicks on a URL to access a web server application 121 (step 200). The web server application 121 is a web application that provides multimedia communications (e.g., multimedia conference calls). The request is redirected to the identification management server 122 (step 204). The identification management server 122 sends the challenge for credentials (step 206) to the browser 102. The user provides a user name and password that are sent to the identification management server 122 by the browser 102 (step 208). The identification management server 122 verifies the user name and password (step 209).

In response, the identification management server 122 sends a GUID (the access token) to the web server application 121 (step 210). The web server application 121 sends the access token to the browser 102 (step 212). The browser 102 and the server application 121 can now communicate using a first socket (step 214). The browser 102 gets the access token (step 216). The browser 102 sends the access token and the address of the web server application 121 to the local application 103A via a local loopback address (step

218). In one example, the local application 103 is an application that gets the user's contact address book (the local information 104). The local application 103A gets the user's contact address book and sends the contact address book to the web server application 121 using a second socket (step 220). The web server application 121 provides the contact address book (e.g., a list of telephone numbers) to the user (as part of a web page displayed in the browser 102) so the user can make a multimedia call to one or more of the contacts in the address book.

Alternatively, the local application 103A may be an application that sends and receives a media stream. For example, the local application 103A may be a WebRTC application that sends a WebRTC media stream (e.g., a voice stream for a voice call) where the browser 102 does not support WebRTC.

In addition, the local application 103A and the browser 102 can send information back and forth if necessary as shown in step 222. For example, the local application 103A can send local information 104 to the browser 102 for display to the user. The local information 104 is sent by the local application 103A via the loopback address to the browser 102. In one embodiment, the local information 104 that is sent from the local application 103A to the browser 102 is then sent to the server application 121 from the browser 102.

In one embodiment, multiple local applications 103A-103N may each have an HTTP stack that is bound to the local loopback address, which is the IP address of 127.0.0.1. In this example, each of the local applications 103A-103N receives the access token to access the server application 121. Each of the local applications 103A-103N can send the local information 104 to the server application 121, where each of the local applications uses different sockets. For example, two local applications 103A-103B can gather and send different types of local information 104 to the server application 121 (a single server application 121). For example, one local application 103A can get local information 104 specific to a communication application and a second local application 103B can get local information specific to a calendaring application. Both sets of local information 104 are sent to the same server application 121.

In one embodiment, there may be multiple web server applications 121 that that concurrently communicate with a single browser 102 and multiple local applications 103A-103N. For example, the server applications 121 (e.g. 121A and 121B) can be an email application 121A and a calendaring application 121B that are displayed in two separate browser sessions in the browser 102. There is a corresponding local email application 103A for the server email application 121A. There is also a corresponding local calendaring application 103B for the server calendaring application 121B.

In this example, two different access tokens are sent to the browser 102 for each communication session. Both access tokens are sent, via the local loopback port. The local applications 103A-103B both have an HTTP stack that is bound to the local loopback address. The local applications 103A-103B can determine which access token is for which local application 103A-103B based a unique identifier that is associated with the corresponding server application 121A-121N. The unique identifier is sent by the code running in the browser 102. For example, the code running in the browser 102 from the email server application 121A would send a unique identifier associated with the email server application 121A along with the access token. Both local applications 103A-103B would see the message. The local application 103A would be looking for the unique identifier associated with the email server application 121A. Similarly, the local application 103B would be looking for a unique identifier associated with the calendaring server application 121B.

The above process will also work where the server applications 121A-121B are on different servers. For example, the server application 121A can be located on a web server 120 while the server application 121B is located on a video server.

In one embodiment, the functionality described for the browser 102 is accomplished by a plug-in that runs in the browser 102. The plug-in is installed into the browser 102.

In FIG. 2, steps 204, 206, 208, 209, and 210 are performed by the identification management server 122. However, in other embodiments, the web server 120 or the server application 121 may perform the functionality of the identification management server 122.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A method comprising:
receiving, by a processor and via a browser, a challenge for one or more user login credentials;
sending, by the processor and from the browser, the one or more user login credentials;
in response to sending the one or more user login credentials, receiving, by the processor and at the browser, a security access token for a remote server application; and
in response to receiving, at the browser, the security access token for the remote server application, sending, by the browser, via the processor, the security access token and an address for the remote server application, via a local loopback address, to a separate local application, wherein the processor, the browser, and the separate local application are on a user communication device and the remote server application is external to the user communication device.

2. The method of claim 1, wherein the remote server application is a remote web server application, and further comprising:
sending, by the separate local application, the security access token to the remote web server application to allow the separate local application to directly communicate with the remote web server application; and
directly sending, by the separate local application, to the remote web server application, local information that cannot be accessed directly by the browser.

3. The method of claim 1, wherein the separate local application sends information to the browser for display in the browser.

4. The method of claim 1, further comprising:
sending, by the separate local application, a request to the remote server application using the security access token.

5. The method of claim 1, wherein claim 1 is implemented as a plug-in the browser.

6. The method of claim 1, wherein the separate local application is a non-browser application.

7. The method of claim 1, wherein the separate local application comprises a plurality of separate local applications that each use the security access token to access the remote server application.

8. The method of claim 1, wherein the separate local application has a Hyper Text Transfer Protocol (HTTP) stack that is bound to the loopback address.

9. The method of claim 8, wherein the loopback address is within an IP address range of 127.0.0.0 to 127.0.0.8.

10. A communication device comprising:
a memory,
a processor in communication with the memory, the processor operable to execute software modules, the software modules comprising:
a browser that receives a challenge for one or more user login credentials; sends the one or more user login credentials; receives a security access token for a remote server application in response to sending the one or more user login credentials, and sends the security access token and an address of the remote server application, via a local loopback address, to a separate local application in response to receiving the security access token for the remote server application, wherein the separate local application is also on the communication device and wherein the remote server is external to the communication device.

11. The communication device of claim 10, further comprising:
the separate local application that sends the security access token to the remote server application to allow the separate local application to directly communicate with the remote server application and directly sends local information that cannot be accessed directly by the browser to the remote server application.

12. The communication device of claim 10, wherein the separate local application sends information to the browser for display in the browser.

13. The communication device of claim 10, wherein the separate local application sends a request to the remote server application using the security access token.

14. The communication device of claim 10, wherein a browser plug-in implements the system of claim 10.

15. The communication device of claim 10, wherein the separate local application is a non-browser application.

16. The communication device of claim 10, wherein the separate local application comprises a plurality of separate local applications that each use the security access token to access the remote server application.

17. The communication device of claim 10, wherein the separate local application has a Hyper Text Transfer Protocol (HTTP) stack that is bound to the loopback address.

18. The communication device of claim 17, wherein the loopback address is within an IP address range of 127.0.0.0 to 127.0.0.8.

19. The communication device of claim 10, wherein the security access token sent to the separate local application identifies a communication session between the browser and the remote server application.

20. The communication device of claim 11, wherein the remote server application sends the sent local information for display in the browser.

* * * * *

UNITED STATES PATENT AND TRADEMARK OFFICE
CERTIFICATE OF CORRECTION

PATENT NO. : 10,601,831 B2
APPLICATION NO. : 14/943225
DATED : March 24, 2020
INVENTOR(S) : Joel M. Ezell, Mehmet C. Balasaygun and Geoff Baskwill Page 1 of 1

It is certified that error appears in the above-identified patent and that said Letters Patent is hereby corrected as shown below:

In the Claims

At Column 8, Line 38, Claim 5 after "plug-in" insert --in-- therein.

Signed and Sealed this
Eighteenth Day of August, 2020

Andrei Iancu
*Director of the United States Patent and Trademark Office*